Patented June 4, 1946

2,401,547

UNITED STATES PATENT OFFICE 2,401,547

PREPARATION OF β-ALANINE BY REDUCTION OF CYANOACETIC ACID

Gustaf H. Carlson, Pearl River, N. Y., assignor to Lederle Laboratories, Inc., New York, N. Y., a corporation of Delaware No Drawing. Application June 19, 1941, Serial No. 398,810

4 Claims. (Cl. 260—534)

This invention relates to catalytic processes and more particularly relates to an improved method for the preparation of β-alanine (β-aminopropionic acid) by the catalytic reduction of cyanoacetic acid.

It has been known in the past that aliphatic nitriles could be converted to the corresponding aliphatic amines by catalytic hydrogenation or reduction methods. These prior methods for catalytically reducing nitriles comprise passing hydrogen through a mixture made up of the nitrile or a solution of the nitrile in an inert solvent and a suspension of a metallic catalyst in a liquid medium. The hydrogenation usually is carried out under pressure, the mixture being agitated during the introduction of the hydrogen until absorption of hydrogen is complete. For example, the German patent No. 597,305 describes a method for catalytically reducing cyanoacetic acid by such a process, the process being carried out in the presence of sulfuric acid. When such a process is employed for catalytically reducing cyanoacetic acid the yields of β-aminopropionic acid (β-alanine) are not particularly good, considerable quantities of side products are produced and the isolation of the desired pure product is difficult. Furthermore, under such conditions of operation the catalyst is usually inactivated before complete reduction is achieved.

In accordance with the present invention an improved method for catalytically reducing cyanoacetic acid is provided which overcomes many of the difficulties encountered in the prior art processes. In carrying out the present invention the reduction of cyanoacetic acid is facilitated by elimination of the sulfuric acid and replacement of the alcohol by acetic acid as the solvent. The most satisfactory yields, with commercial applicability, are best obtained, not by the usual method of hydrogenation, involving a mere simultaneous agitation of a mixture of all the substance to be reduced with a small amount of catalyst, but by gradual addition of the cyanoacetic acid to the reaction mixture at a rate controlled to prevent inactivation of the catalyst. Platinum oxide, the usual platinized or palladinized active charcoal, celite, or superfiltrol may be used. The preferred catalyst is one prepared by reducing palladium chloride in the presence of activated charcoal and an amount of anhydrous sodium acetate in excess of that required to react with the liberated hydrogen chloride.

The invention will be more fully described in conjunction with the following specific example. It should be understood, however, that the example is given merely by way of illustration and does not represent limiting values attained in application of the improved method herein described.

Example 1

The apparatus consisted of a reaction flask, charged with one gram of activated charcoal, 0.2 grams of palladium chloride, 1 gram of sodium acetate and 50 cc. of glacial acetic acid, and an attached, modified dropping funnel; communicating at the top, through flexible tubing, with a gasometer and with the reaction flask, through suitably arranged rigid tubing, to permit of equalization of the pressure within the system. A solution of 2 grams of cyanoacetic acid and 1 gram of sodium acetate in 50 cc. of glacial acetic acid was introduced into the dropping funnel and added, during 12 hours, to the agitated catalyst, prepared just prior to the addition of the solution. When reduction stopped (the calculated volume, 1060 cc., of hydrogen had been absorbed), hydrogen chloride (6.5 grams) was absorbed in the reduction product, solids were filtered off and solvent was distilled in vacuo from the filtrate. The residue was washed with ether and extracted with 30 cc. of hot n-butanol. The filtered solution was evaporated to dryness in vacuo and the residue was digested with 25 cc. of concentrated hydrochloric acid for 45 minutes at 100° C.; solvent was distilled in vacuo; the residue was washed with ether and extracted with hot isopropanol, leaving a small amount of undissolved ammonium chloride. The total yield of β-alanine hydrochloride (M. P. 115–120°) isolated by fractional crystallization from the isopropanol solution was 1.25 grams (42.3%).

In the foregoing example a specific type of apparatus was described for carrying out the reaction. The invention, however, is not limited to the use of such an apparatus. The reaction may be carried out in any suitable apparatus which will permit the solution of cyanoacetic acid in glacial acetic acid to be added gradually to the suspension of the catalyst while hydrogen is being passed through the reaction mixture. The rate of addition will vary somewhat depending upon the relative strength of the solutions employed. In most instances, however, the addition of the cyanoacetic acid to the suspension of the catalyst is completed in from about 6 to 12 hours. The concentration of the cyanoacetic acid solution may be varied over wide limits. The best results are obtained, however, with dilute solutions and complete reduction is more readily achieved when the rate of addition of the nitrile is so controlled that the concentration of unreduced material in the presence of the catalyst is kept at a minimum. In the example the β-alanine was isolated as the hydrochloride and is the preferred method. However, if desired, the β-alanine may be isolated in the form of other salts, for example, sulfate, perchlorate, picrate, or the like.

What I claim is:

1. In a process of producing β-alanine by the catalytic reduction of cyanoacetic acid, the improvement which comprises slowly adding at such a rate that there is no substantial inactivation of the catalyst, over a period of from 6 to 12 hours, an acetic acid solution of cyanoacetic acid to a suspension of a hydrogenation catalyst in acetic acid while effecting reduction of the cyanoacetic acid to β-alanine by the introduction of hydrogen.

2. In a process of producing β-alanine by the catalytic reduction of cyanoacetic acid, the improvement which comprises slowly adding at such a rate that there is no substantial inactivation of the catalyst, over a period of from 6 to 12 hours, an acetic acid solution of cyanoacetic acid and sodium acetate to a suspension of a hydrogenation catalyst and sodium acetate in acetic acid while effecting reduction of the cyanoacetic acid to β-alanine by the introduction of hydrogen.

3. A process according to claim 1 in which a palladium catalyst is employed.

4. A process according to claim 2 in which a palladium catalyst is employed.

GUSTAF H. CARLSON.